(12) United States Patent
Ram et al.

(10) Patent No.: US 10,804,945 B1
(45) Date of Patent: Oct. 13, 2020

(54) APPARATUS AND METHODS OF DYNAMIC INTERFERENCE CANCELLATION FOR WIRELESS RECEIVERS

(71) Applicant: NXP USA, Inc., Austin, TX (US)

(72) Inventors: B Hari Ram, Chennai (IN); Lokesh Sundaramurthy Satrasala, Bangalore (IN); Sudhir Srinivasa, Campbell, CA (US); Hongyuan Zhang, Fremont, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/176,147

(22) Filed: Oct. 31, 2018

Related U.S. Application Data

(60) Provisional application No. 62/692,332, filed on Jun. 29, 2018.

(51) Int. Cl.
*H04B 1/12* (2006.01)
*H04B 7/0452* (2017.01)
*H04W 84/12* (2009.01)

(52) U.S. Cl.
CPC .......... *H04B 1/123* (2013.01); *H04B 7/0452* (2013.01); *H04W 84/12* (2013.01)

(58) Field of Classification Search
CPC combination set(s) only.
See application file for complete search history.

(56) References Cited

U.S. PATENT DOCUMENTS

| 7,209,522 B1 * | 4/2007 | Shirali | H04L 1/0631 375/144 |
| 7,242,720 B2 | 7/2007 | Sugiyama et al. | |
| 7,826,337 B2 * | 11/2010 | Shi | H04B 7/2606 370/201 |
| 8,995,543 B2 * | 3/2015 | Fechtel | H04L 25/0224 375/260 |
| 9,209,873 B1 | 12/2015 | Zhang et al. | |

(Continued)

OTHER PUBLICATIONS

"Notice of Allowance", U.S. Appl. No. 15/672,117, dated May 2, 2019, 7 pages.

(Continued)

*Primary Examiner* — Junpeng Chen

(57) ABSTRACT

The present disclosure describes apparatuses and methods for dynamic interference cancellation in wireless receivers. In some aspects, a signal vector transmitted through a wireless environment is received via multiple antennas of a receiver, the signal vector affected by interfering signals in the wireless environment. The receiver determines an interference channel matrix for the signal vector based on the interference received with the signal vector and selects, from the interference channel matrix, columns of the interference channel matrix to form a noise-cancelling equalization matrix. The receiver then equalizes the signal vector with the noise-cancelling equalization matrix to remove a portion of interference from the signal vector to provide noise-cancelled equalized values of the signal vector for decoding. By so doing, the receiver may reduce effects of interference of the wireless environment (e.g., interfering streams or signals) to improve receive performance for signal vectors that are intended for reception by the receiver.

20 Claims, 8 Drawing Sheets

(56) References Cited

U.S. PATENT DOCUMENTS

| | | | |
|---|---|---|---|
| 10,389,414 | B1 | 8/2019 | Qi et al. |
| 10,397,933 | B1 | 8/2019 | Mu et al. |
| 2006/0274691 | A1 | 12/2006 | Naguib et al. |
| 2007/0030914 | A1 | 2/2007 | Ding et al. |
| 2007/0249296 | A1 | 10/2007 | Howard et al. |
| 2009/0180404 | A1 | 7/2009 | Jung et al. |
| 2012/0127889 | A1* | 5/2012 | Yomo ............... H04L 25/0232 370/252 |
| 2012/0288021 | A1 | 11/2012 | Park et al. |
| 2013/0016767 | A1* | 1/2013 | Pean ................. H04L 1/0001 375/232 |
| 2016/0234042 | A9 | 8/2016 | De Victoria |
| 2016/0285525 | A1 | 9/2016 | Budianu et al. |
| 2017/0214429 | A1 | 7/2017 | Eistein et al. |
| 2018/0006690 | A1* | 1/2018 | Shepard ............. H04B 7/0617 |
| 2018/0270038 | A1 | 9/2018 | Oteri et al. |
| 2019/0253111 | A1 | 8/2019 | Zheng et al. |

OTHER PUBLICATIONS

"Pre-Interview Communication", U.S. Appl. No. 16/163,167, dated Jun. 25, 2019, 3 pages.

"Notice of Allowance", U.S. Appl. No. 15/611,050, dated Feb. 21, 2019, 5 pages.

"Notice of Allowance", U.S. Appl. No. 15/849,213, dated Apr. 10, 2019, 6 pages.

"Pre-Interview Communication", U.S. Appl. No. 15/672,117, dated Jan. 15, 2019, 3 pages.

"Pre-Interview Communication", U.S. Appl. No. 15/849,213, dated Feb. 6, 2019, 3 pages.

"Notice of Allowance", U.S. Appl. No. 16/163,167, dated Oct. 16, 2019, 8 Pages.

"Amendment 4: Enhancements for Very High Throughput for Operation in Bands below 6 GHz", IEEE Std 802.11ac-2013, 2012, 425 pages.

"Amendment 5: Enhancements for Higher Throughput", 2007, 536 pages.

"First Action Interview Office Action", U.S. Appl. No. 15/611,050, dated Oct. 19, 2018, 3 pages.

"Pre-Interview Communication", U.S. Appl. No. 15/611,050, dated Aug. 10, 2018, 3 pages.

Bellalta, "IEEE 802.11ax: High-Efficiency WLANs", Accepted for publication in IEEE Wireless Communications Magazine. Jul. 2015, Jul. 2015, 16 pages.

Mu, et al., "Utility U.S. Appl. No. 15/849,213, filed Dec. 20, 2017", 46 pages.

* cited by examiner

APPARATUS AND METHODS OF DYNAMIC INTERFERENCE CANCELLATION FOR WIRELESS RECEIVERS

CROSS REFERENCE TO RELATED APPLICATIONS

This present disclosure claims priority to U.S. Provisional Patent Application Ser. No. 62/692,332 filed Jun. 29, 2018, the disclosure of which is incorporated by reference herein in its entirety.

BACKGROUND

Many computing and electronic devices access the Internet or other resources through wireless networks, which are typically provided and administered by an access point or base station. As data consumption levels and device densities increase, device manufacturers and network architects continue to develop new generations of networking equipment and corresponding communication schemes capable of supporting higher data rates and increased spectrum efficiency. In other words, the network architects have worked to increase a number of devices that can simultaneously access a given wireless network, and have increased the amount of data exchanged through physical resources of a wireless network. To do so, some wireless networking systems implement spatial reuse in which network spectrum is reused or reallocated for devices that are separated by distance or directionality. For example, two different wireless networks may operate using same or similar channels when respective access points and devices of the two wireless networks are separated geographically. In other scenarios, respective transmissions of a base station to multiple devices of a wireless network may vary in direction, yet use similar channels or spatial resources.

When not sufficiently separated by distance, direction, or spatial resource allocation, however, transmission signals intended for one device may interfere with signals intended for other devices that are configured to use a same or similar wireless channels for communication. Such situations may commonly arise as more devices are added to wireless networks, mobile devices move throughout a wireless network resulting in directional conflicts, or at boundaries of the wireless network where transmission power is maximized to reach far away devices. Because many of these signals originate from one source, such as a base station communicating with multiple devices, a device subject to the interference may not be able to distinguish interfering signals transmitted to other devices from signals intended for reception by that device. As such, these interfering signals typically impair reception performance of the device attempting to receive intended signals, which can result in lower receive performance or reduced data throughput.

SUMMARY

This summary is provided to introduce subject matter that is further described in the Detailed Description and Drawings. Accordingly, this Summary should not be considered to describe essential features nor used to limit the scope of the claimed subject matter.

In some aspects, an interference canceller implements a method that receives, via multiple antennas of the device, a signal vector transmitted through a wireless environment, the signal vector being affected by interference of the wireless environment. The interference canceller determines an interference channel matrix for the signal vector based on the interference received with the signal vector and selects, from the interference channel matrix, columns of the interference channel matrix to form a noise-cancelling equalization matrix. The interference canceller then equalizes the signal vector with the noise-cancelling equalization matrix to remove at least a portion of the interference from the signal vector to provide noise-cancelled equalized values of the signal vector, such as for subsequent decoding or soft-decoding to obtain information of the signal vector.

In other aspects, an apparatus for wireless communication is described that includes multiple antennas and a receiver having multiple inputs coupled to respective ones of the multiple antennas. The apparatus also includes an equalizer operably associated with the receiver and an interference canceller configured to receive, via the multiple antennas, a signal vector transmitted through a wireless environment, the signal vector being affected by interference present in the wireless environment. The interference canceller is also configured to determine an interference channel matrix for the signal vector based on the interference received with the signal vector and select, from the interference channel matrix, one or more columns of the interference channel matrix to form a noise-cancelling equalization matrix. The interference canceller then equalizes, with the equalizer and based on noise-cancelling equalization matrix, the signal vector to remove at least a portion of the interference from the signal vector to provide noise-cancelled equalized values of the signal vector.

In yet other aspects, a System-on-Chip (SoC) is described that includes receiver that having multiple receive chains, a zero-forcing equalizer, and a hardware-based processor. The SoC also includes a memory storing processor-executable instructions that, responsive to execution by the hardware-based processor, implement an interference canceller to receive, via the multiple receive chains of the receiver, a signal vector transmitted through a wireless environment, the signal vector being affected by interference of the wireless environment. The interference canceller is also implemented to determine an interference channel matrix for the signal vector based on the interference received with the signal vector and select, from the interference channel matrix, columns of the interference channel matrix to form a noise-cancelling equalization matrix. The interference canceller then causes the zero-forcing equalizer to equalize, based on noise-cancelling equalization matrix, the signal vector to remove at least some of the interference from the signal vector to provide noise-cancelled equalized values of the signal vector.

The details of one or more implementations are set forth in the accompanying drawings and the following description. Other features and advantages will be apparent from the description and drawings, and from the claims.

BRIEF DESCRIPTION OF THE DRAWINGS

The details of one or more implementations of dynamic interference cancellation for wireless receivers are set forth in the accompanying figures and the detailed description below. In the figures, the left-most digit of a reference number identifies the figure in which the reference number first appears. The use of the same reference numbers in different instances in the description and the figures indicates like elements.

DETAILED DESCRIPTION

Figure 1:
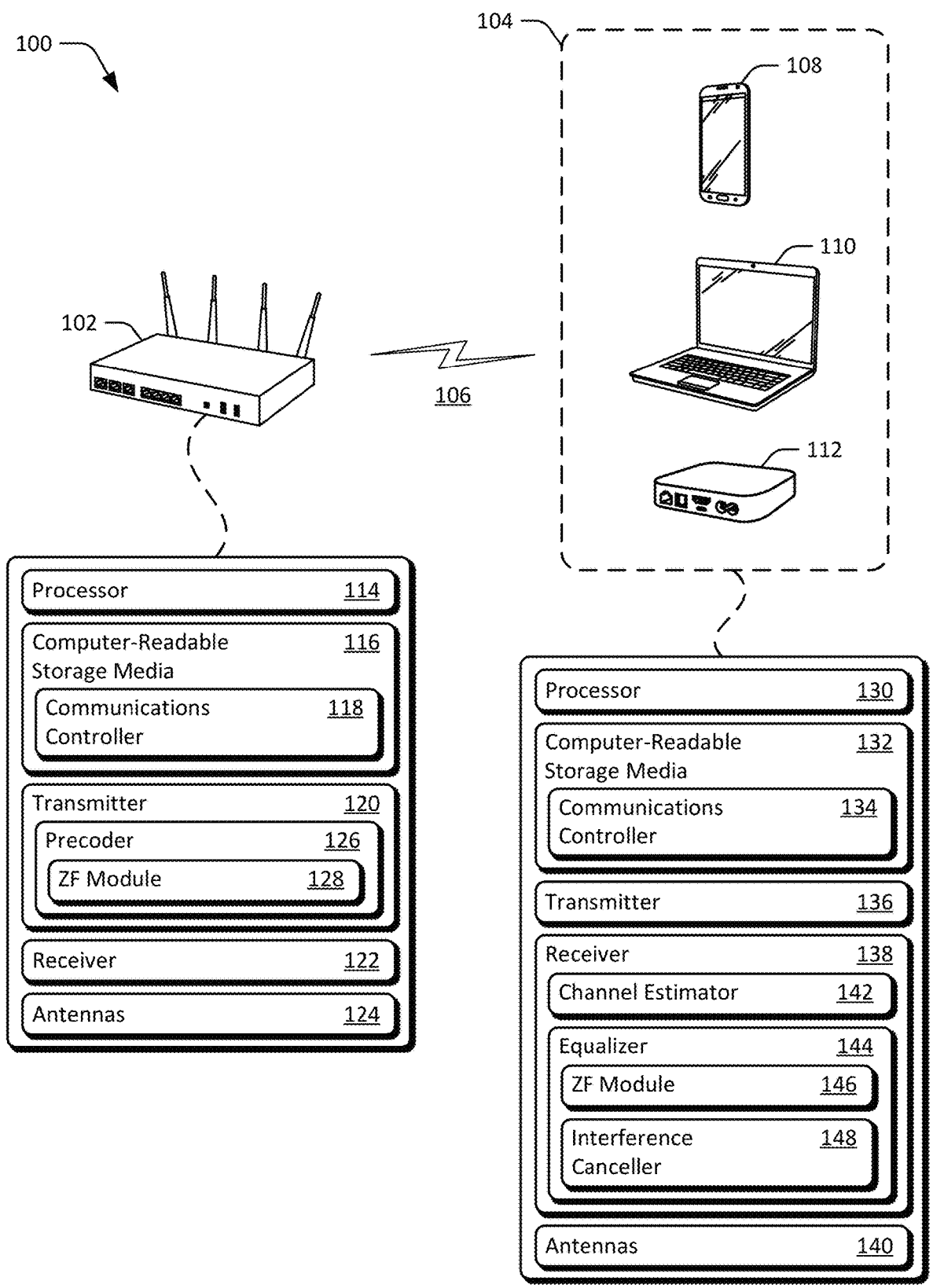
FIG. 1 illustrates an example operating environment having devices that are capable of wireless communication in accordance with one or more aspects.

Conventional techniques of multi-user communication often result in interference between respective spatial streams transmitted to different receiving devices or users of a wireless network. For example, precoding of transmission signals is typically unable to resolve conflicts between respective sets of spatial streams transmitted to two or more devices of a wireless network. Each of these devices, which attempts to receive spatial streams intended for that device, also receives portions or fragments of the other spatial streams as interference to the device's own intended spatial streams. Alternately or additionally, the intended spatial streams may be received with other interference present in an environment in which the receiving devices operates, such as transmissions of an overlapping BSS or another noise source. As such, the intra-stream interference or other interference received with the intended spatial streams can impair or degrade receiver performance of the device attempting to receive the intended spatial streams.

This disclosure describes apparatuses and techniques of dynamic interference cancellation for wireless receivers. In some aspects, a signal vector transmitted through a wireless environment is received via multiple antennas of a receiver, wherein the signal vector is affected by interference of the wireless environment. The receiver determines an interference channel matrix for the signal vector based on the interference received with the signal vector and selects, from the interference channel matrix, columns of the interference channel matrix to form a noise-cancelling equalization matrix. The receiver then equalizes the signal vector with the noise-cancelling equalization matrix to remove a portion of interference from the signal vector to provide noise-cancelled equalized values of the signal vector for decoding. By so doing, a receiver may reduce effects of interfering packets or signals of the wireless environment to improve performance (e.g., bit-error rate) for signal vectors that are intended for reception by the device.

These and other aspects described herein may be performed to enable a receiver to cancel or suppress interference of signals transmitted to other devices, interference of signals transmitted by devices of an OBSS, or other sources of co-channel interference (e.g., BlueTooth® devices). For example, a receiver of a laptop computer may receive signal vectors as part of a MU-MIMO transmission from an access point to the laptop computer and other devices of a BSS to which the laptop computer is associated. These signal vectors, however, may be received with or affected by interference associated with others of the MU-MIMO transmissions or transmissions of other devices in a wireless environment of the laptop computer.

Based on the interference received with the signal vectors, such as the interfering signal vectors intended for other devices, an interference canceller of the receiver calculates or determines an interference channel matrix for the wireless environment. The interference canceller then selects, from the interference channel matrix, columns to form a noise-cancelling equalization matrix. With the noise-cancelling equalization matrix, the interference canceller equalizes the signal vectors to cancel the interference received with the signal vectors to provide noise-cancelled equalized values of the signal vector. These noise-cancelled equalized values can then be decoded to obtain information of the signal vector, thereby improving receiver performance of the laptop computer. This is but one example of the ways in which aspects of dynamic interference cancellation for wireless receivers may improve receive performance of a wireless device.

The following discussion describes an operating environment, techniques that may be employed in the operating environment, and a System-on-Chip (SoC) in which components of the operating environment can be embodied. In the context of the present disclosure, reference is made to the operating environment by way of example only.

Operating Environment

FIG. 1 illustrates an example of an operating environment 100 having a host device 102 and client devices 104 that are capable of communicating data, symbols, packets, protocol data units (PDUs), and/or frames over a wireless connection 106, such as a wireless-local-area network (WLAN). A WLAN may operate in accordance with one or more Institute of Electronics and Electrical Engineers (IEEE) 802.11 standards, such as IEEE 802.11a, IEEE 802.11g, IEEE 802.11n, IEEE 802.11ac, IEEE 802.11ad, IEEE 802.11ax, IEEE 802.11ay, IEEE 802.11-2016, or the like. Alternately or additionally, the wireless connection 106 or other wireless connections of the devices may be implemented as a personal area network (PAN, e.g. IEEE 802.15), peer-to-peer network, mesh network, or cellular network, such as in accordance with a standard or protocol as set forth by the 3rd Generation Partnership (3GPP, e.g., fourth generation (4G) or fifth generation (5G) communication projects).

In this example, the host device 102 is embodied as an access point (AP) that is capable of providing and managing a wireless network, such as a WLAN or Wi-Fi® network implemented in accordance with any of the IEEE 802.11 standards. The wireless network provided by the access point includes one or more wireless connections 106 that enable connectivity with respective client devices 104. In other cases, the host device 102 may include or be embodied as an enhanced node access point, set-top box, wireless router, network gateway, broadband router, modem device, gaming device, hotspot device, or other network administration device. The client devices 104 of the example environment 100 include a smart-phone 108, laptop computer 110, and set-top box 112, any of which may also be referred to as station devices or stations (STAs, e.g., mobile- or fixed-STAs) of the wireless network. Although not shown, other configurations of the client devices 104 are also contemplated, such as a desktop computer, tablet computer, smart-watch, server, home theater personal computer (HTPC), gaming controllers, television, content-streaming device, high-definition multimedia interface (HDMI) media stick, wearable-computers, smart appliance, home automation controller, smart thermostat, Internet-of-Things (IoT) device, security system, mobile-internet device (MID), network-attached-storage (NAS) drive, mobile gaming console, camera, printer, scanner, and so on.

Generally, the host device 102 provides connectivity to the Internet, other networks, or networked-resources through a backhaul link (not shown), which may be either wired or wireless (e.g., a T1 line, fiber optic link, broadband cable network, intranet, a wireless-wide-area network). The backhaul link may include or connect with data networks operated by an internet service provider, such as a digital subscriber line or broadband cable provider and may interface with the host device 102 via an appropriately configured modem (not shown). While associated with the host device 102 via a wireless connection 106, the smart-phone 108, laptop computer 110, or set-top box 112 may access the Internet, communicate with each other, or access other networks for which host device 102 acts as a gateway.

The host device 102 includes a processor 114 configured to execute processor-executable instructions and computer-readable storage media 116 (CRM 116). In some cases, the processor 114 is implemented as an application processor or baseband processor to manage operation and connectivity of the host device 102. The CRM 116 of the host device 102 may include any suitable type and/or combination of storage media, such as read-only memory (ROM), random access memory (RAM), or Flash memory. The CRM 116 may store firmware, an operating system, or applications of the host device 102 as instructions that are executed by the processor 114 to implement various functionalities of the host device 102. In this example, a communications controller 118 for managing communication operations of the host device 102 is embodied on the CRM 116.

The communications controller 118 may include or represent any suitable combination of components to enable various communication operations, such as a precoder, channel sounder, beamforming module, multiple-input multiple-output (MIMO) module for single-user (SU-) or multiple-user (MU-) MIMO operations, spatial stream processor, or the like. Although not shown in this example, the communication controller 118 may include or control components for implementing one or more aspects of dynamic interference cancellation for wireless receivers as described herein. The implementations and/or uses of the communications controller 118 vary, and are described throughout the disclosure.

The host device 102 also includes a transmitter 120, receiver 122, and antennas 124 for providing a wireless network, communicating with the client devices 104, or communicating other wirelessly-enabled devices. The transmitter 120 or receiver 122 may include any suitable number of respective communication paths (e.g., transmit or receive chains) to support transmission or reception of multiple spatial streams of data. In some cases, the receiver 122 of the host device 102 is implemented with functionalities or components for implementing aspects of dynamic interference cancellation for wireless receivers, which are described throughout this disclosure. Although not shown, radio frequency (RF) front-end circuitry of the host device 102 can couple or connect the transmitter 120 or receiver 122 to the antennas 124 to facilitate various types of wireless communication. The antennas 124 of the host device 102 may include an array of multiple antennas that are configured similar to or differently from each other.

In this example, the transmitter 120 of the host device 102 also includes a precoder 126 and zero-forcing module 128. Generally, the precoder 126, which implement zero-forcing precoder operations with the zero-forcing module 128 (e.g., as a zero-forcing precoder), precodes signals or signal vectors for transmission by the transmitter 120 of the host device 102. In some cases, the zero-forcing module 128 zero-forces precoding matrices and channel matrices such that intra-stream interference or other interference of a wireless environment is nulled or reduced for signals or signal vectors transmitted to a client device. Alternately or additionally, precoding matrices and channel matrices of differing dimensions may result in partial or incomplete zero-forcing in which signal vectors received at a device may include residual interference or noise that is not cancelled by precoding at or by the transmitter. The implementations and/or uses of the precoder 126 and zero-forcing module 128 vary, and are described throughout the disclosure. Alternately or additionally, a client device 104 may include respective instances of a precoder 126 and/or zero-forcing module 128 for precoding signals for transmission.

Each of client devices 104 (e.g., stations or STAs) includes a processor 130 and computer-readable storage media 132 (CRM 132). The processor 130 can be any suitable type of processor, either single-core or multi-core, for executing instructions or code associated with applications and/or an operating system of the client device 104. The CRM 132 may include any type and/or combination of suitable storage media, such as RAM, non-volatile RAM (NVRAM), ROM, or Flash memory useful to store data of applications and/or an operating system of the client device 104.

In this example, each client device 104 may also include a communication controller 134, which can embodied on the CRM 132 and implemented via a hardware-based processor (e.g., software defined radio). In some cases, the communications controller 134 is implemented in whole or part as a baseband processor, digital signal processor (DSP), or wireless interface controller of a client device 104. The communications controller 134 may include, represent, and/or control any suitable combination of components to enable various communication operations, such as a precoder, channel sounder, beamforming module, multiple-input multiple-output (MIMO) module for MU-MIMO or SU-MIMO operations, spatial stream processor, or the like. Although not shown, the communication controller 134 may also include components for implementing one or more aspects of dynamic interference cancellation for wireless receivers as described herein. The implementations and/or uses of the communications controller 134 vary, and are described throughout the disclosure.

Each of the client devices 104 also includes a transmitter 136, receiver 138, and antennas 140 for communicating with the host device 102 or other wirelessly-enabled devices. Although shown as separate entities, the transmitter 136 and receiver 138 may be implemented in combination as a transceiver component that supports both transmit and receive functionalities. The transmitter 136 or receiver 138 may include any suitable number of respective communication paths (e.g., transmit or receive chains) to support transmission or reception of multiple spatial streams of data. Front-end circuitry (not shown) of the client device 104 may couple or connect the transmitter 136 or receiver 138 to the antennas 140 to facilitate various types of wireless communication. The antennas 140 may include an array of multiple antennas that are configured similar to or differently from each other.

In this example, the receiver 138 of a client device 104 also includes or is operably coupled with a channel estimator 142, an equalizer 144, a zero-forcing module 146, and an interference canceller 148. Generally, the channel estimator, which may be a component of a frequency domain processing block (not shown), estimates one or more channels of a wireless environment, such as based on signal vectors, interference, sounding packets, or other signals received by the receiver 138. Alternately or additionally, the channel estimator 142 may generate a model of conditions or state of a wireless channel, such as to provide state information for the channel (channel state information) or an effective channel matrix for signal vectors (e.g., intended or interfering signals) received through the channel of the wireless environment.

Based on channel matrices or channel estimates, the interference canceller 148 can generate channel matrices or form equalization matrices for cancelling noise (e.g., noise-cancelling equalization matrices) from signal vectors received via the receiver 138. In some cases, the equalizer 144 and/or zero-forcing module 146 equalize, based on the noise-cancellation equalization matrices, received signal vectors to remove noise from or reduce noise of the signal vectors. The implementations and uses of these entities vary, and are described throughout the disclosure. Alternately or additionally, respective instances of a channel estimator 142, an equalizer 144, a zero-forcing module 146, and/or an interference canceller 148 may be embodied by the receiver 122 or communications controller 118 of the host device 102 to implement aspects of dynamic interference cancellation.

Figure 2:
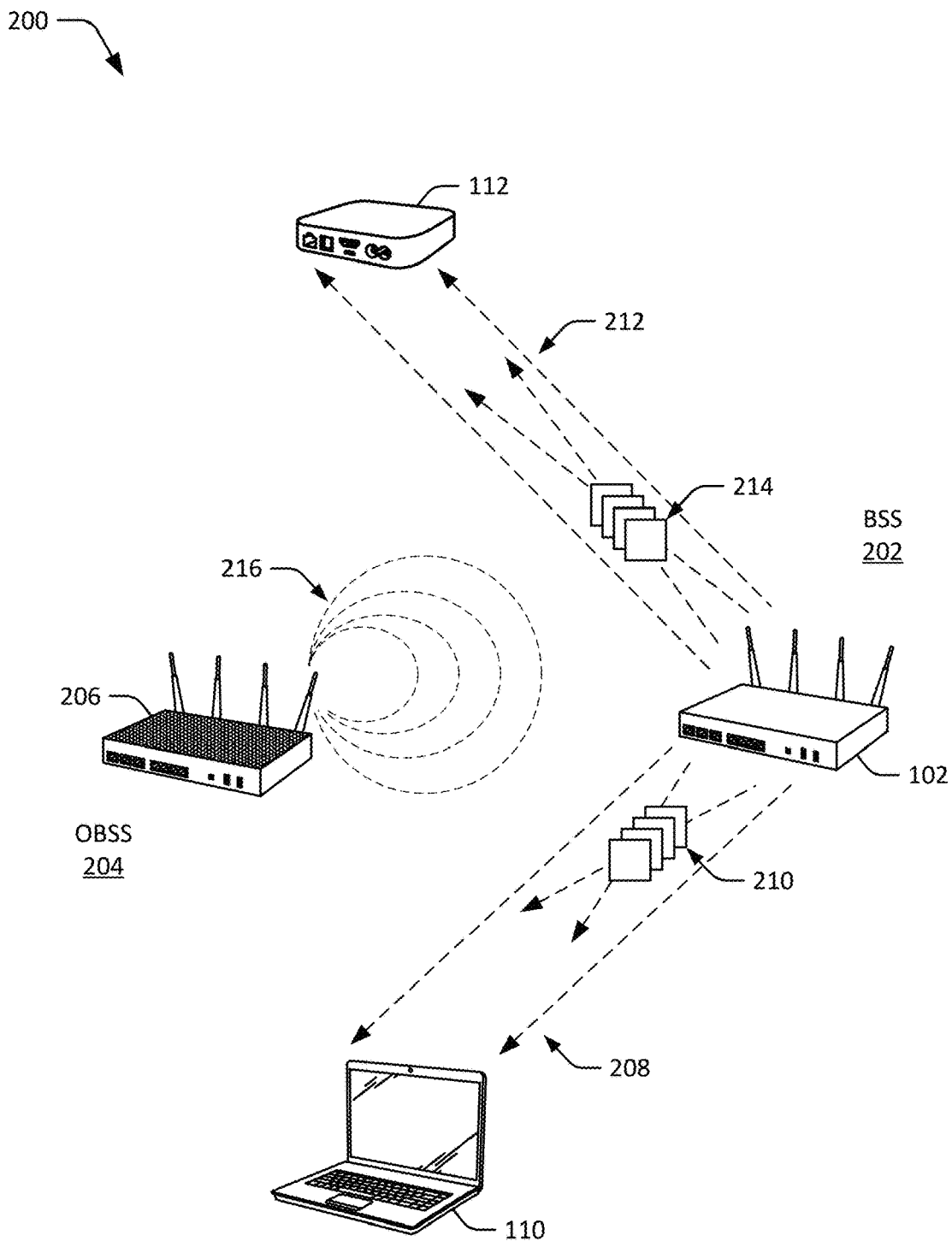
FIG. 2 illustrates an example wireless networking environment that includes the devices of FIG. 1 in a basic service set and an overlapping basic service set.

FIG. 2 illustrates example wireless networking environment 200 that includes devices of a basic service set 202 (BSS 202) that is provided by a host device 102 for client devices 104 of the BSS 202. The wireless network environment 200 may also include an overlapping BSS 204 (OBSS 204) that is managed by another access point 206 that provides a wireless network for other client devices (not shown) of the OBSS 204. In some cases, respective communication areas of the BSS 202 and the OBSS 204 overlap such that devices or stations of either network may be within communication range of other devices or stations of the other network. As shown in FIG. 2, the host device 102 (e.g., an access point) may communicate with multiple client devices 104 of the BSS 202 through MU-MIMO transmissions or communication operations. Here, two client devices 104 of the BSS 202 are illustrated as a laptop computer 110 and set-top box 112, though the BSS may also include any number of additional client device 104 or other host devices 102, such as to provide a mesh wireless network or an extended wireless network with multiple host devices 102 (e.g., access points, repeaters, or bridges).

The BSS 202 and/or OBSS 204 may be provided or managed in accordance with any suitable wireless communication protocol or standard, such as IEEE 802.11b, IEEE 802.11g, IEEE 802.11n, IEEE 802.11a IEEE 802.11ac, IEEE 802.11ad, IEEE 802.11ax, IEEE 802.11ay, IEEE 802.11-2016, or the like. For example, a host device 102 may operate in accordance with the IEEE 802.11ac standard or IEEE 802.11ax standard to support MU-MIMO communication in which data of different users or client devices is multiplexed in the spatial domain, such as through orthogonal frequency-division multiplexing (OFDM) schemes or technology. Although shown as including infrastructure type Wi-Fi networks, the networking environment 200 may also be implemented with one or more of a peer-to-peer network, mesh network, personal area network, or cellular network. For example, interfering packets or interfering signals may originate from a PAN or Bluetooth® link implemented between devices of the BSS 202 or other devices proximate the BSS 202.

In various aspects, one or more devices of the wireless networking environment 200 are configured to implement MIMO or MU-MIMO communications. As shown in FIG. 2, the host device 102 can transmit multiple spatial streams 208 by which packets 210 are encoded for transmission to the laptop computer 110, and multiple spatial streams 212 by which packets 214 are encoded for transmission to the set-top box 112. Here, the packets 210 or packets 214 may be referred to as intended packets, which are intended for reception by the laptop computer 110 and set-top box 112, respectively. The spatial streams 208 or spatial streams 212 may be transmitted as signals or signal vectors by which symbols of a packet are encoded from transmission through the wireless environment. Generally, intended communications or data are exchanged between devices or stations of a same BSS, a shared wireless connection, or a same wireless network, such as BSS 202.

With reference to MU-MIMO communications, a signal received at a device may include signals intended for or desired by the device, as well as portions of signals intended for other devices or users of the wireless network, which may be referred to as interference. For example, the laptop computer 110 may receive signal vectors that correspond to the spatial streams 208 intended for the laptop computer 110, as well as portions of signals that correspond to the spatial streams 212 intended for the set-top box 112, which are interfering signals to the laptop 110. Thus, signals or signal vectors received by a device may include desired signals and interfering signals that correspond to other devices or users of the wireless network. In some cases, these interference signals impair or degrade receiver performance of the devices of the BSS 202 that are attempting to receive intended packets or information.

At a physical (PHY) layer of the 802.11 standard, transceivers of the devices may implement a Physical Layer Convergence Procedure (PLCP) sublayer for communicating frames or packets. The PLCP sublayer may prepare a frame for transmission by taking the frame from the media access control (MAC) sublayer and creating a PLCP Protocol Data Unit (PPDU) packet. A physical medium dependent (PMD) sublayer of the PHY then modulates and transmits the packet data as bits or a bit stream via signals (or signal vectors) transmitted through the wireless environment. Accordingly, any data, packet, or frame described herein may include a protocol data unit (PDU), MAC PDU (MPDU), PLCP service data unit (PSDU), PLCP PDU (PPDU), or the like.

The wireless networking environment may also include the overlapping basic service set 204, which includes the access point 206 and other devices (not shown), located proximate or within the BSS 202. Generally, the access point 206 communicates with the other devices or clients of the OBSS 204 using various transmission techniques, such as beamforming or MIMO. In the context of this example, however, the access point 206 can be another interfering transmitter or source of interference for the devices of BSS 202. Here, assume that a device of the OBSS 204 is located proximate the host device 102, laptop computer 110, or set-top box 112 (or any other device) of the BSS 202. Signals 216 (e.g., spatial streams) or other noise transmitted by the access point 206 can interfere (e.g., interfering packets) with communication operations of the devices of the BSS 202. As such, these signals or other communications originating from the OBSS 204 may also be referred to as an interfering signal, interfering packet, or generally as interference received by the devices of BSS 202. Thus, the interference originating from the OBSS 204 may also impair or degrade receiver performance of the devices of the BSS 202 that are attempting to receive intended packets or information transmitted by the host devices 102.

Figure 3:
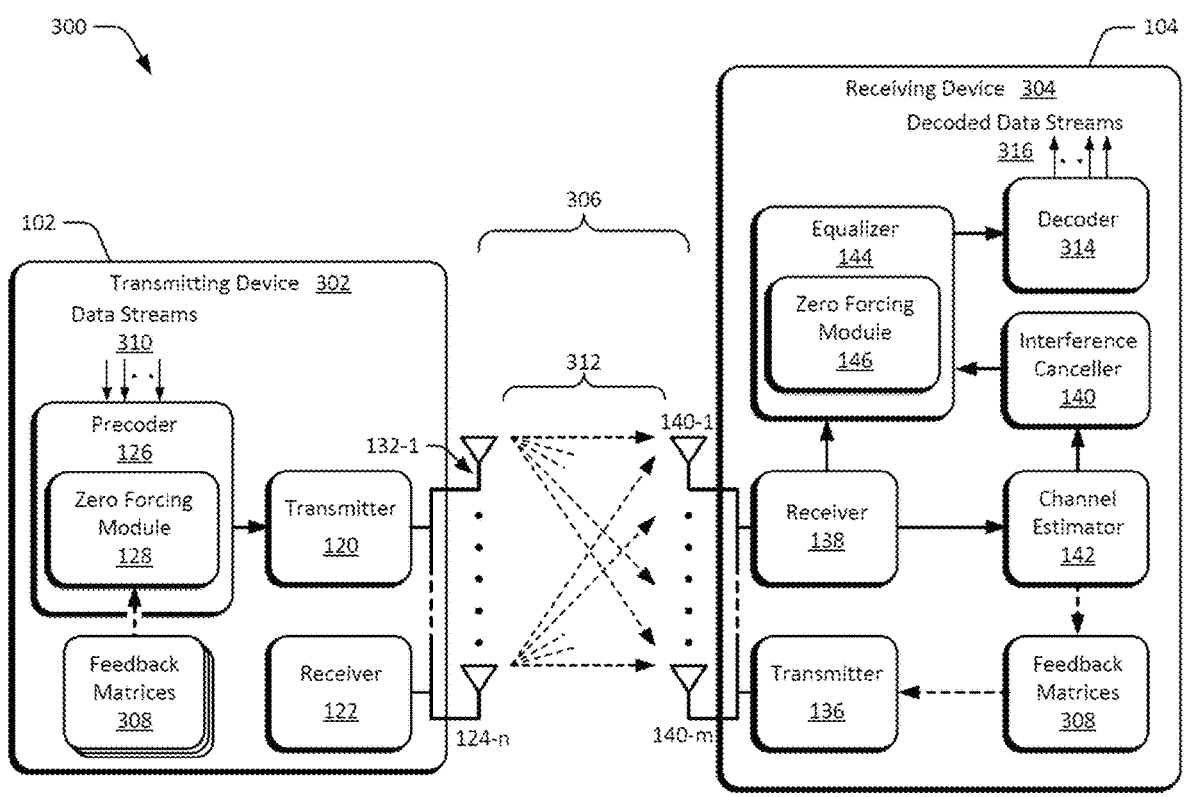
FIG. 3 illustrates example configurations of the devices of FIG. 1 that are implemented as a respective transmitting device and a receiving device, which includes an interference canceller.

FIG. 3 illustrates example configurations of a host device 102 and client device 104 at 300 that are implemented as a transmitting device 302 and receiving device 304, respectively. In this example, the host device 102 is shown as the transmitting device 302 and the client device 104 is shown as the receiving device 304, though these roles may be reversed depending on a direction of communication and/or interference reception. For the context of this discussion, the transmitting device 302 and receiving device 304 may communicate via MIMO or MU-MIMO operations in which the transmitting device 302 transmits spatial streams (ss) to the receiving device 304 and/or other devices of a wireless network.

Generally, the transmitting device 302 and receiving device 304 communicate via channel 306 of a wireless environment (e.g., wireless medium), such as air, the atmosphere, or other media through which electromagnetic (EM) waves propagate. A channel 306 between the transmitting device 302 and the receiving device 304 (e.g., one of the client devices 104) may be characterized by information that describes conditions or a state of the channel. In some cases, this channel state information (CSI) is useful to adjust or refine transmission or reception parameters of signals transmitted or received through the channel 306 by respective ones of the devices.

To determine the conditions or state of the channel 306, the receiving device 304 may implement channel estimation via the channel estimator 142 to estimate a channel for a combined signal channel, a channel for desired signal vectors, a channel for interfering signals, or the like. Alternately or additionally, the channel estimator 142 may generate feedback matrices 308 that describe one or more of the estimated or effective channels at the receiving device 304. In some cases, the feedback matrices 308 are sent to the transmitting device 302 for use in generating steering matrices and/or precoding data streams 310 for transmission.

In aspects of dynamic interference cancellation, the transmitting device 302 and the receiving device 304 may perform or implement MU-MIMO communication operations between multiple devices. By way of example, consider FIG. 4 in which the host device 102 and client devices 104 of a wireless networking environment are illustrated as implementing MU-MIMO communication generally at 400. Here, the host device 102 acting as an access point is transmitting spatial streams to the laptop computer 110 and the set-top box 112. A system for MU-MIMO communication may be modeled as shown in equation 1, in which the laptop computer 110 may be considered an $i^{th}$ device (or $i^{th}$ user) of a wireless network.

$$y_i = H_{ii}x_i + \sum_{j=1, j \neq i}^{N} H_{ij}x_j + n_i$$

Equation 1

Received signal vector $y_i$ at the $i^{th}$ device

With reference to equation 1, the variables of the system may be defined as follows, wherein $y_i = N_{r,i} \times 1$ is the received signal vector at $i^{th}$ device, $H_{ii} = N_{r,i} \times N_{ss,i}$ is an effective channel matrix of a desired signal vector at the $i^{th}$ device, $x_i = N_{ss,i} \times 1$ is a transmitted signal vector of the desired signal vector at the $i^{th}$ device, $H_{ij} = N_{r,i} \times N_{ss,j}$ is an effective interference channel matrix at the $i^{th}$ device, $x_1 = N_{ss,j} \times 1$ is a transmitted signal vector for other users at the $i^{th}$ device, $n_i = N_{r,i} \times$ noise vector at the $i^{th}$ device, $N_{r,i}$ is a number of receive antennas at the $i^{th}$ device, $N_{ss,i}$ is number of streams intended or required for the $i^{th}$ device, N is a total number of devices (or users), and $$N_{ss,total} = \sum_{j=1}^{N} N_{ss,i}$$

is a total number of spatial streams present in the received signal.

Based on the system model and a number and/or respective antenna configurations of devices with which a host device 102 or access point communicates, a total number of spatial streams received by a client device 104 ($N_{ss,total} (= \Sigma_j N_{ss,j})$) may be fewer, same as, or exceed a number of antennas by which the client device 104 receives incoming signals or spatial streams. Depending on these combinations, dynamic interference may be implemented with or based on the following cases.

In a first case, $N_{ss,i} = N_{r,i}$ and $N_{ss,total} > N_{r,i}$, a number of spatial streams intended for the receiving device equals a number of receive antennas and the total number of spatial streams is greater than the number of receive antennas. In this case, an optimum precoder can be a zero-forcing precoder, which may result in residual interference observed at a receiving device, such that the receiving device may perform noise whitening.

In a second case, $N_{ss,i} < N_{r,i}$ and $N_{ss,total} \leq N_{r,i}$, a number of spatial streams intended for the receiving device is fewer than a number of receive antennas and the total number of spatial streams is less than or equal to the number of receive antennas and in a third case, $N_{ss,i} < N_{r,i}$ and $N_{ss,total} > N_{r,i}$, a number of spatial streams intended for the receiving device is fewer than a number of receive antennas and the total number of spatial streams is greater than the number of receive antenna. For the second case and the third case, a number of spatial streams to decode is fewer than a number of receive antenna available, which enables the available spatial dimension ($N_{r,i} - N_{ss,i}$) to be used to null or reduce interfering signals.

Returning to FIG. 3, the transmitting device 302 can implement MIMO transmissions through the channel 306 of the wireless environment to the client devices 104 by precoding data streams 310 of information prior to transmission. In this example, the data stream 310 are precoded by the precoder 126, which may use feedback matrices 308 or effective channel matrices to precode the data streams 310 for transmission to an intended client device 104. In some cases, the effective channel matrices for an $i^{th}$ device of a wireless network may be represented as shown in equation 2.

$H_{ij} = H_{ii,a}Q_j, j=1, \ldots, N$ $= H_{I,a} = H_{ii,a} \times [Q_1, \ldots, Q_{i-1}, Q_{i+1}, \ldots, Q_N]$ Equation 2: Effective Channel Matrices at the $i^{th}$ Device With reference to equation 2, $H_{ii}$ may be defined as an $N_{r,i} \times N_{ss,i}$ channel matrix that corresponds to an intended or desired signal vector, and $H_{I,i}$ can be defined as an $N_{r,i} \times (N_{ss,total} - N_{ss,i})$ channel matrix corresponding to signals of other devices, where the total number of spatial streams corresponds to those of the other devices. In at least some aspects, a preamble of a MU-MIMO packet or frame may include or indicate a number of spatial streams for an intended device, a total number of spatial streams in a received signal, the channel matrix of the desired signal, and/or the channel matrix for the signals of the other devices or interfering signal channel matrix. Alternately or additionally, $H_{ii,a}$ can be defined as an $N_{r,i} \times N_t$ matrix that corresponds to the channel 306 between the transmitting device 302 and the receiving device 304 or the $i^{th}$ device in the context of FIG. 4.

The effective channel matrices also include one or more precoding matrices $Q_x$ that is used to precode spatial streams for transmission to the $x^{th}$ device (or user) of the wireless network. Generally, the precoder 126 may be configured to satisfy precoding criteria such that (i) interfering signals are nulled and (ii) to enable successful decoding at an intended device. Examples of these criteria are shown below as equation 3 and are defined in the context of the model system described herein.

$$H_{I,i} = 0, \forall i=1,\ldots,N \qquad \text{criteria (i)}$$

$$\text{rank}(H_{ii}) \geq N_{ss,i}, \forall i=1,\ldots,N \qquad \text{criteria (ii)}$$

Equation 3: Precoding Criteria for Zero-Forcing and Decoding

With reference to equation 3, these criteria may include (i) nulling or zero-forcing the interfering signals for all instances or all users of the wireless network and/or (ii) having a rank of the channel matrix for the intended signal vectors being equal or greater than a number of spatial streams intended for each of the intended receiving devices (e.g., to prevent rank deficiency). Here, note that criteria (i) may not always be satisfied by the precoder 126 depending on a number of spatial streams transmitted, a configuration of transmit antenna, and/or respective configurations of receive antennas. For example, consider again the wireless network environment illustrated in FIG. 4 in which respective antenna configurations of each device are indicated. Here, the host device 102 is configured with four transmit antennas 124-1 through 124-4 ($N_t=4$), the laptop computer is configured with three receive antennas 140-1 through 140-3 ($N_{r,1}=3$,) and the set-top box 112 is also configured with three receive antennas 140-1 through 140-3 ($N_{r,2}=3$,). With the host device 102 transmitting two spatial streams to the laptop computer ($N_{ss,1}=2$) and two spatial streams to the set-top box ($N_{ss,2}=2$), the dimensions of the resulting Q matrices are $Q_1$—4×2, $Q_2$—4×2 and the dimensions of the resulting channel matrices are $H_1$—3×4, $H_2$—3×4, thus not symmetrical.

Figure 4:
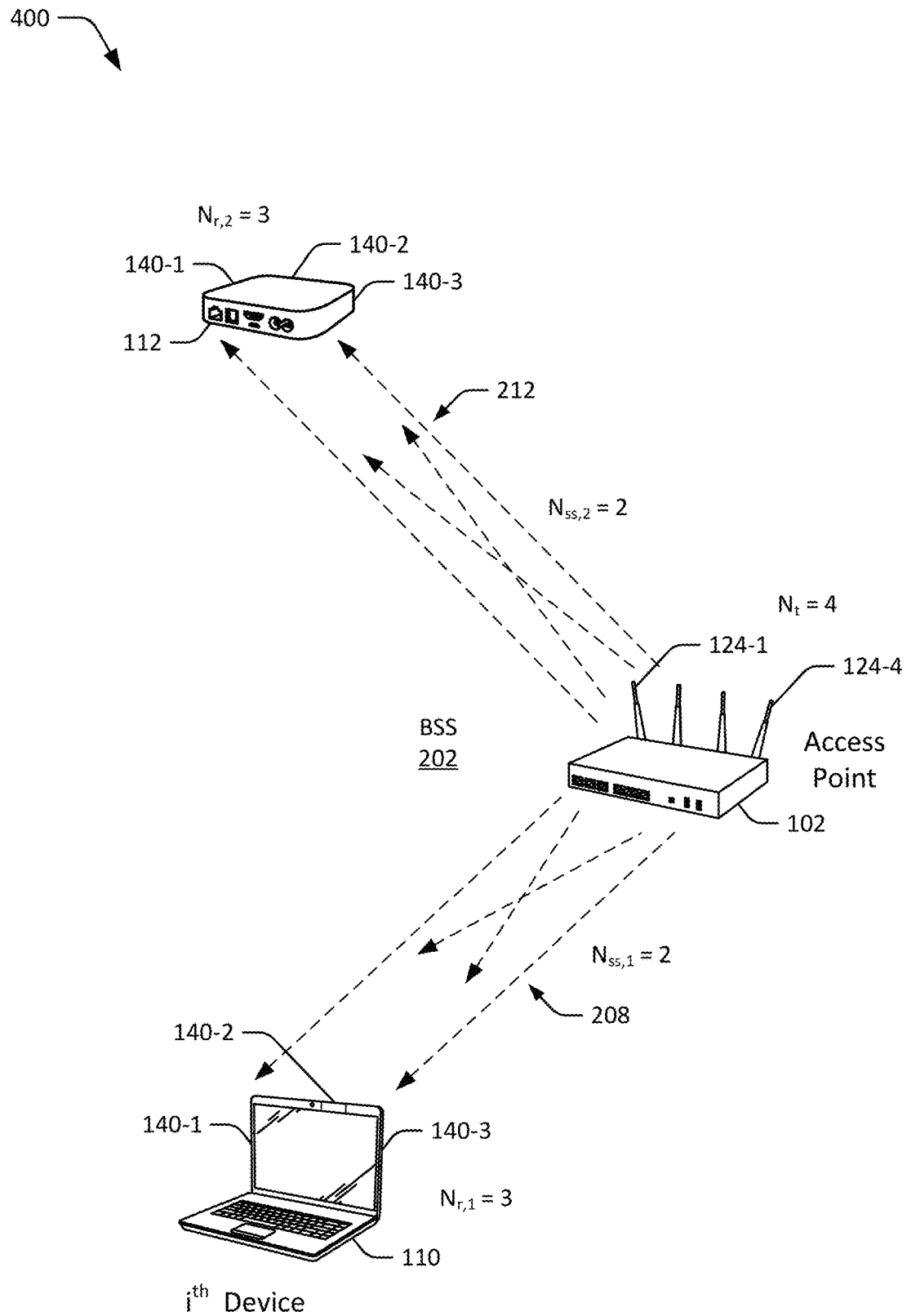
FIG. 4 illustrates an example of multi-user multiple-input multiple-output (MU-MIMO) communication between devices of the wireless networking environment in accordance with one or more aspects.

With the zero-forcing criteria being typically configured to achieve $H_1 Q_2=0$, and $H_2 Q_1=0$, the precoder 126 and zero-forcing module 128 will be unable to satisfy this condition give the Q matrices of FIG. 4. As such, the precoder 126 may be configured with alternate criteria as shown below in equation 4, where a rank of the interference channel matrix is less than the available spatial dimension of a number of receive antenna minus a number of intended spatial streams for each of the intended receiving devices.

$$\text{rank}(H_{I,i}) \leq N_{r,i} - N_{ss,i}, \forall i=1,\ldots,N \qquad \text{criteria (a)}$$

$$\text{rank}(H_{ii}) \geq N_{ss,i}, \forall i=1,\ldots,N \qquad \text{criteria (b)}$$

Equation 4: Additional Precoding Criteria for Zero-Forcing and Decoding

Based on these precoding configurations, the precoder 126 and/or zero-forcing module 128 can precode the data streams 310 for transmission, via the transmitter 120, as signal vectors 312 across the channel 312 between the transmitting device 302 and receiving device 304. Across the channel 312 of the wireless environment, the receiving device 304 receives one or more signal vectors 312, which may have been affected by conditions of the channel 312, such as distance, fading, multipath reflections, noise, and the like.

The receiver 138 can receive or detect the signal vectors 312 or receive signals at the antennas 140-1 through 140-$m$ of the receiving device 304. In some aspects, the received signal vectors 312, which can be received via multiple receive chains of the receiver 138, are passed to the channel estimator 142 and the equalizer 144 for equalization and/or noise cancelling. Thus, the receiver 138 can obtain channel information (e.g., channel response) about respective signal paths between a transmitter, such as an access point transmitting MU-MIMO signals, and each of the antennas 140-1 through 140-$m$ at which the signal vectors are received.

The receiver 138 coupled to the antennas 140-1 through 140-$m$ may provide any or all received spatial streams, packet, or signals to the interference canceller 140, channel estimator 142, equalizer 144, and/or a frequency domain processing block. In some aspects of dynamic interference cancellation, the receiver 138 or receiving device 304 has access to channel estimates provided by the channel estimator 142 for the interfering signals and for intending signal, which may be used to cancel noise through equalization.

For example, the interference canceller 140 can sort or select columns of an interference channel matrix based on the channel estimates. From the sorted or selected columns of the interference channel matrix, the interference canceller 140 can provide a noise-cancelling equalization matrix for use with the equalizer 144 and/or zero-forcing module 146. In some cases, equalizing the received signal vectors with the noise-cancelling equalization matrix provides noise-cancelled equalized values of the signal vectors that are sent to a decoder 314 of the receiving device 304. With the noise-cancelled equalized values, the decoder 314 can soft-decode the values provide decoded data streams 316 from which information of the signal vector is obtained. The information of the signal vector may include symbols, control information, control commands, and/or data of a packet or frame with which the signal vector corresponds.

In aspects of dynamic interference cancellation, the precoder 126 of the transmitting device can be implemented to follow the criteria (i) and (ii) as described herein such that the precoder 126 may null or cancel one or more interference streams, though it may not be possible to have channel estimates with columns close to zero. Generally, applying the equalizer 144 with interference cancelling will provide equalized interference-cancelled signal vectors or values as shown in equation 5.

$$y'_i = H_{ii}^{-1} y_i = x_i + \sum_{j=1, j \neq i}^{N} H_{ii}^{-1} H_{ij} x_j + H_{ii}^{-1} n_i \qquad \text{Equation 5}$$

Noise-cancelled equalized signal vector at the $i^{th}$ device

With respect to the variables of equation 5, $x^{-1}$ is a pseudo-inverse of the variable, such that $H_{ii}^{-1}$ is the pseudo-inverse of the channel matrix for the intended or desired signal vectors at the $i^{th}$ device. Here, the residual noise term of equation 5

$$\left( \sum_{j=1, j \neq i}^{N} H_{ii}^{-1} H_{ij} x_j \right)$$

may be zero or near zero if the precoder 126 is able to null interfering streams. Alternately, the residual noise term may not be zero if criteria (a) is followed or applied by the precoder 126. In such cases, receive performance of the receiver 138 or receiving device 304 may be affected by the presence of a non-zero interfering signal.

As described herein, the equalizer 144 can be applied to signal vectors or symbol vectors to reduce or cancel interference that is received along with the vectors. With respect to the second case and third case for MIMO communication in which a number of receive antenna is greater than a number of intended spatial streams for a device, a zero-forcing equalization matrix for dynamic interference cancellation may be determined or formed as shown in equation 6 from an interference channel matrix or channel matrix that corresponds to signals of devices other than the intended recipient device.

$$N_I = \min(\text{rank}(H_{I,i}), N_{r,i} - N_{ss,i}),$$ (6)

Where columns from $H_{I,i}$ are used as part of the pseudo-inverse, let $W_{ii} = [H_{ii}, H_{I,s}]$ the zero-forcing equalization matrix where $H_{I,s}$ is the selected columns from $H_{I,i}$ of dimension $N_{r,i} \times N_I$ Equation 6: Zero-Forcing Equalization Matrix Here, a number of columns of the interference channel matrix are selected based on channel estimates and using the available spatial dimension that enables the nulling or cancellation of the interfering signal. Applying this zero-forcing equalization matrix (e.g., noise-cancelling interference matrix) to signal vectors at the equalizer can be effective to provide noise-cancelled equalized signal vectors as shown in equation 7.

$$y'_i = W_{ii}^{-1} y_i = W_{ii}^{-1} H_{ii} x_i + \sum_{j=1, j \neq i}^{N} W_{ii}^{-1} H_{ij} x_j + H_{ii}^{-1} n_i \quad \text{Equation 7}$$

Zero-forced equalized signal vectors

From the zero-forced or noise-cancelled equalized signal vectors $y'_i$, intended signal values $N_{ss,i}$ can be extracted and used for decoding or soft-decoding to obtain information of the received signal vectors. With the interference or noise of the signal vectors cancelled, receive performance of the receiver 138 and associated components may be improved versus attempting to demodulate and decode signal vectors that are affected by non-zero or uncancelled interference and noise. Alternately or additionally, when the estimated interference channel $\hat{H}_{ii} = W_{ii}^{-1} H_{ii}$ is not an identity matrix, upper left values in $N_{ss,i} \times N_{ss,i}$ of $\hat{H}_{ii}$ can be used as channel estimates, such as for soft-decoding in the decoder 314.

Turning now to determination of the zero-forcing or noise-cancelling equalization matrix, the interference canceller can select columns of the interference channel matrix to form the noise-cancelling equalization matrix. This may include computing respective norm values for columns of the interference channel matrix and ranking the columns of the interference channel matrix based on the respective norm values of the columns. For example, columns of an interference channel matrix or channel matrix corresponding to signal of the other devices may be selected as shown in 8.

$H_{I,i} = [I_1, I_2, \ldots, I_{N_{ss,total} - N_{ss,i}}]$, where $I_j$ is the $j^{th}$ column vector of $H_{I,i}$ compute the norm of each column as Norm=$[|I_1|_p, |I_2|_p, \ldots, |I_{N_{ss,total} - N^{ss,}}_i|_p]$, where $|I_j|_p$ is the p-norm of $I_j$ Equation 8: Norm Computation for Zero-Forcing Equalization Matrix Here, for the available spatial dimension (e.g., total minus intended streams) norms are computed for the columns of the interference channel matrix, where p can be any suitable integer, such as one or two in some implementations. From the norms, considering the columns that are non-zero in value, the zero-forcing equalization matrix can be determined as shown in equation 9 below.

$H'_{I,i} = [I_{l_1}, I_{l_2}, \ldots, I_{l_{N_I}}]$, where $I_{l_k}$ are the interfering column vectors which satisfies $|I_{l_k}|_p \geq \gamma$ $H_{I,s} = [I_{l_1}, \ldots, I_{l_{\min(N_{r,i} - N_{ss,i}, N_I)}}] : N_{r,i} \times \min(N_{r,i} - N_{ss,i}, N_I)$ matrix Equation 9: Combined Channel Matrix for the Zero-Forcing Equalization Matrix The interfering column vectors can be selected such that $\gamma$ of equation 9 is met by the interfering vectors where $\gamma$ is a function of signal and noise power for a column vector. Alternately or additionally, $l_k$ can be selected as or for the indices that satisfy the $\gamma$ criteria and/or the indices may be sorted in descending order based on $|I_j|$ as part of the determination of the zero-forcing equalization matrix. In other cases, the zero-forcing equalization matrix can be formed as shown in equation 10, where $m_k$ are the indices such that $H_{I,s}$ has full column rank.

$H'_{I,i} = [I_{l_1}, I_{l_2}, \ldots, I_{l_{N_I}}]$, $H_{I,s}$ is formed as:

$H_{I,s} = [I_{m_1}, \ldots, I_{m_{\min(N_{r,i} - N_{ss,i}, \text{rank}(H'_{I,i}))}}] N_{r,i} \times \min(N_{r,i} - N_{ss,i}, \text{rank}(H'_{I,i}))$ matrix Equation 10: Combined Channel Matrix with Full Column Rank In some cases, the selected columns are determined or found as linearly independent columns from an $H_{I,s}$. Alternately or additionally, an $H_{I,s}$ that spans an entire space occupied by the interference signal can be determined through a singular value decomposition of $H'_{I,i}$ or through a sorted QR decomposition of $H'_{I,i}$. These are but a few example ways in which to form or determine a zero-forcing or noise-cancelling equalization matrix.

In some aspects, dynamic noise cancellation applied through equalization may not null or zero all of an interference signal present in a received signal vector such that residual interference (e.g., equation 5, residual noise term) remains after equalizer-based noise cancellation. In such cases, log-likelihood ratio (LLR) values may be determined based at least in part on the channel interference matrix (e.g., an estimated interference channel $\hat{H}_{ii}$) and the residual noise of the equalized values can be whitened using the LLR values. Generally, for the system model described herein, approximate LLR's for bit $b_j$ transmitted on the subcarrier i can be computed as shown in equation 11.

$$LLR = \max_{x_k \in B_{j,0}} \|y_i - \hat{H}_{ii} x_k\|^2 - \max_{x_k \in B_{j,1}} \|y_i - \hat{H}_{ii} x_k\|^2 \quad \text{Equation 11}$$

LLR values for subcarriers of the received signals

Here, $B_{j,0}$ may represent a set of all constellation points whose mapping bit sequence contains bit $b_j=0$ and $B_{j,1}$ represents a set of all constellation points whose mapping bit sequence contains bit $b_j=1$. Respective ones of the transmitted data symbols may also be chosen from a finite constellation set, such that each constellation point maps to a particular value of a N-bit information sequence $\{b_0, b_1, \ldots b_{N-1}\}$ of the mapping. The LLR calculation of equation 11 may be used by the interference canceller 140 when residual or effective noise of the signal vectors is flat. Alternately or additionally, LLR values may be calculated as shown in equation 12 below, such as for when the effective noise may not be flat.

$$LLR = \frac{\max_{x_k \in B_{j,0}} \|y_i - \hat{H}_{ii} x_k\|^2 - \max_{x_k \in B_{j,1}} \|y_i - \hat{H}_{ii} x_k\|^2}{\sum_{j=1, j \neq i}^{N} \|\hat{H}_{ij}\|_{fro}^2 + \sigma_n^2} \quad \text{Equation 12}$$

LLR values for non-flat noise

For the LLR calculation of equation 12, the residual interference ($\|\hat{H}_{ij}\|_{fro}^2$) and/or noise variance ($\sigma_n^2$) can be relatively small values. In such cases, a range of LLR values provided by the interference canceller 140 when using the algorithm of equation 12 may be relatively high compared with those provided when the interference canceller 140 implements the algorithm of equation 11 to provide LLR values. Accordingly, a normalizing factor (K) can be applied to the LLR to provide modified LLR values as shown by equation 13.

$$LLR = \quad \text{Equation 13}$$
$$g \times \max_{x_k \in B_{j,o}} \|y_i - \hat{H}_{ii} x_k\|^2 - \max_{x_k \in B_{j,1}} \|y_i - \hat{H}_{ii} x_k\|^2 \text{ where,}$$
$$g = \frac{K}{\sum_{j=1, j \neq i}^{N} \|\hat{H}_{ij}\|_{fro}^2 + \sigma_n^2}$$

Modified LLR values

In some aspects, the normalizing factor (K) can be applied and chosen such that a values of (g) are approximately one.

With respect to terms of equation 11, $\|A\|_{fro}^2$ may represent a trace of a covariance matrix ($\text{trace}\{AA^H\}$) and $\hat{H}_{ij}$ may represent an estimated interference channel for signal of other devices that are not the intended receiving device ($W_{ii}^{-1} H_{ij}, \forall j$). Alternately or additionally, in the estimated interference channel $\hat{H}_{ij}$ some columns can be zeros and $H_{I,s}$ can be used in forming $W_{ii}^{-1}$ which is selected from $H_{I,i}$. In some cases, un-used columns (e.g., weak columns) of $H_{I,i}$ are to be used in computation of $$\sum_{j=1, j \neq i}^{N} \|\hat{H}_{ij}\|_{fro}^2,$$

whereas in other cases of noise cancellation stronger columns of the interference channel matrix are used.

Techniques of Dynamic Interference Cancellation

The following discussion describes techniques of dynamic interference cancellation for wireless receivers, which may reduce effects of interfering signals or improve receiver performance. These techniques can be implemented using any of the environments and entities described herein, such as the channel estimator 142, equalizer 144, zero-forcing module 146, or interference canceller 148 embodied on a host device or client device. These techniques include methods illustrated in FIGS. 4, 5, and 6, each of which is shown as a set of operations performed by one or more entities.

These methods are not necessarily limited to the orders of operations shown. Rather, any of the operations may be repeated, skipped, substituted, or re-ordered to implement various aspects described herein. Further, these methods may be used in conjunction with one another, in whole or in part, whether performed by the same entity, separate entities, or any combination thereof. For example, the methods may be combined to implement interference estimation, carrier sensing, and/or interference cancellation operations during in an environment in which an interfering transmitter operates. In portions of the following discussion, reference will be made to the operating environment 100 of FIG. 1, networking environment 200 of FIG. 2, and entities of FIG. 3 and/or FIG. 4 by way of example. Such reference is not to be taken as limiting described aspects to operating environment 100, specific entities, or specific configurations, but rather as illustrative of one of a variety of examples.

Figure 5:
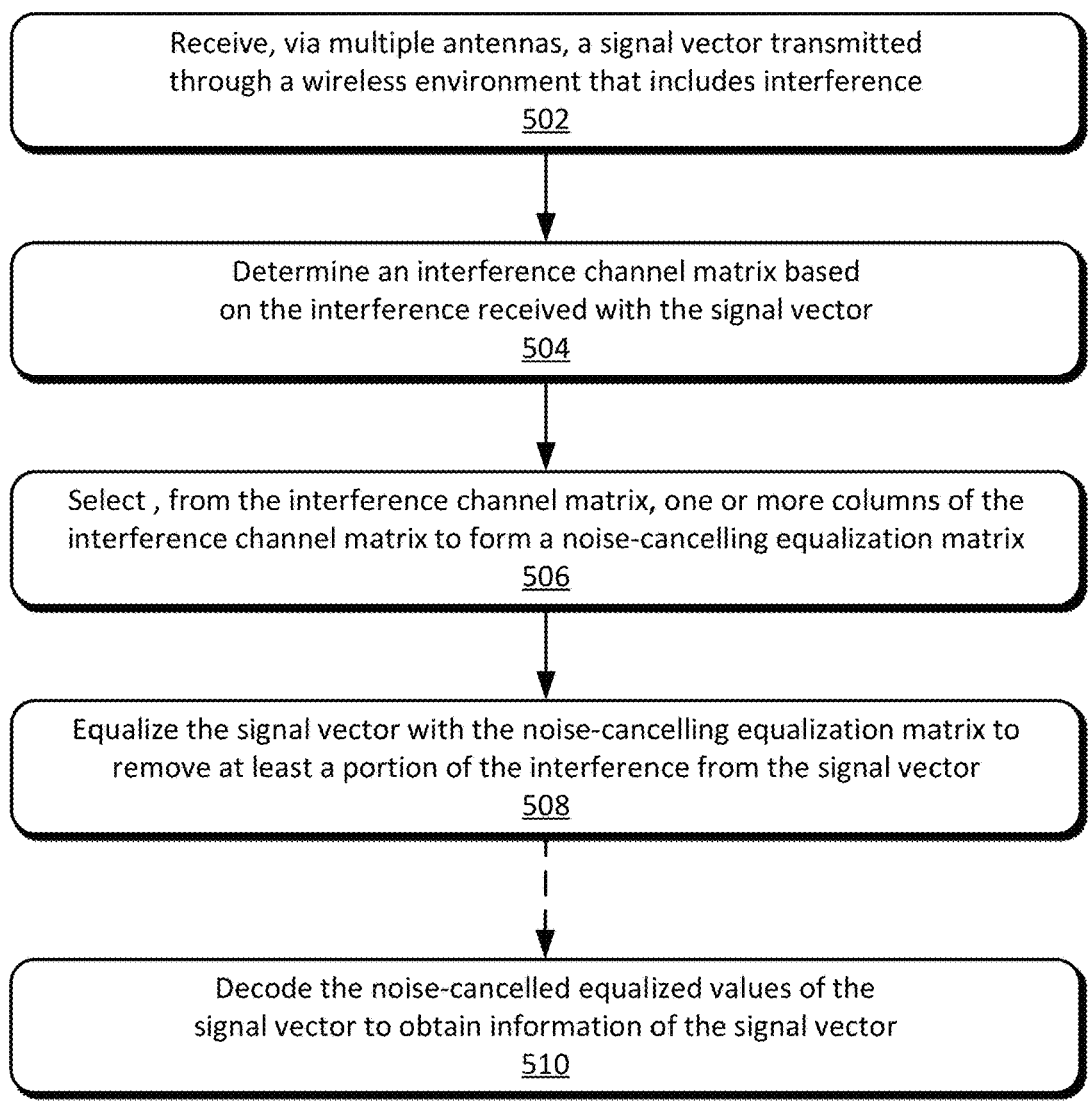
FIG. 5 depicts an example method of dynamic interference cancellation for wireless receivers in accordance with one or more aspects.

FIG. 5 depicts an example method 500 of dynamic interference cancellation for wireless receivers in accordance with one or more aspects, including operations performed by the interference canceller 148.

At 502, a signal vector transmitted through a wireless environment is received via multiple antennas of a receiver. The signal vector includes, or is affected by, interference of the wireless environment that can be received with or prior to receiving the packet. In some cases, the interference is associated with another transmission to another device or another transmission made as part of a MU-MIMO transmission to multiple devices or stations of a wireless network. The signal vector that is received may also be precoded via zero-forcing precoding by a transmitter prior to transmission through the wireless environment. Alternately or additionally, the interference of the wireless environment is associated with transmissions of an access point or client station of an overlapping basic service set.

At 504, an interference channel matrix is determined based on the interference received with the signal vector.

The interference channel matrix may be determined with or as part of a channel matrix that describes a channel of the wireless environment between the receiver and a transmitter from which the signal vector is received. In some cases, the interference channel matrix is determined based on an inference channel estimate of the wireless environment that is estimated from received interference or interference received with the signal vector.

At 506, one or more columns of the interference channel matrix are selected from the interference channel matrix to form a noise-cancelling equalization matrix or a zero-forcing equalization matrix. In some aspects, norm values for the columns of the interference channel matrix are calculated and the columns ranked based on the calculated norm values. Alternately or additionally, the columns of the interference channel matrix may be selected based on their respective ranking.

At 508, the signal vector is equalized with the noise-cancelling equalization matrix to remove at least a portion of the interference from the signal vector. In some cases, this is effective to zero-force equalize the signal vector at the receiving device. Equalizing the signal vector may provide a noise-cancelled equalized signal vector or noise-cancelled equalized values of or for the signal vector. By so doing, the receiver may reduce effects of interference of the wireless environment (e.g., interfering packets or signals) to improve receive performance for signal vectors or packets that are intended for reception by the receiver.

Optionally at 510, the noise-cancelled equalized values of the signal vector are decoded to obtain information of the signal vector. The noise-cancelled equalized values can be soft-decoded depending on a configuration of a receiver or decoder performing the decoding operations. In some cases, the information of the signal vector corresponds to control information, connection management commands, or data of a packet or frame transmitted to the receiving device.

Figure 6:
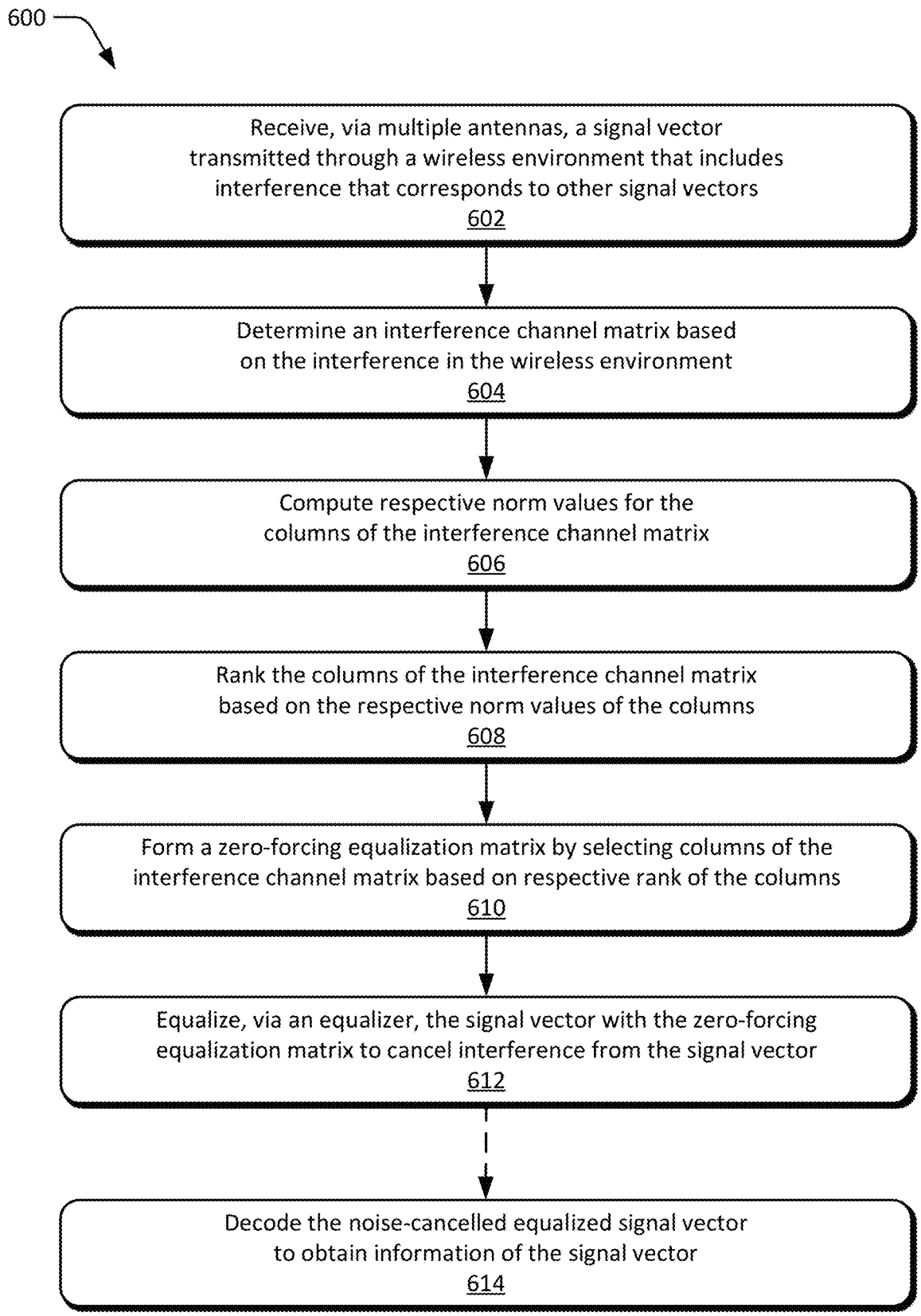
FIG. 6 depicts an example method for equalizing a signal vector with a zero-forcing equalizer to cancel interference from the signal vector.

FIG. 6 depicts an example method 600 for equalizing a signal vector with a zero-forcing equalizer to cancel interference from the signal vector, including operations performed by the equalizer 144, zero-forcing module 146, or interference canceller 148.

At 602, a signal vector transmitted through a wireless environment is received via multiple antennas of a receiver. The signal vector includes, or is affected by, interference of the wireless environment that can be received with or prior to receiving the packet. In some cases, the interference is associated with another transmission to another device or another transmission made as part of a MU-MIMO transmission to multiple devices or stations of a wireless network. Alternately or additionally, the interference of the wireless environment can be associated with transmissions of an access point or client station of an overlapping basic service set.

At 604, an interference channel matrix is determined based on the interference in the wireless environment. The interference of the wireless environment may include interference caused or associated with other transmitted signals of a MU-MIMO communication with which the signal vector is associated. For example, the interference may include intra-stream interference between respective spatial streams transmitted to the receiving device and other devices of a wireless network.

At 606, respective norm values for the columns of the interference channel matrix are calculated or determined. In some cases, the interference canceller of the receiver calculates the respective norm values for the columns of the interference matrix. In some cases, the interference canceller determines the interference channel matrix with indices such that the interference channel matrix has full column rank. Alternately or additionally, the interference canceller can determine or find linearly independent columns of the interference channel matrix.

At 608, the columns of the interference channel matrix are ranked based on their respective norm values. In some cases, only non-zero columns of the interference channel matrix are considered for sorting or ranking by the interference canceller of the receiving device. Alternately or additionally, the interfering column vectors may be selected such that the column vectors satisfy a pre-defined signal and/or noise power threshold.

At 610, a zero-forcing equalization matrix is formed by selecting columns of the interference channel matrix based on respective ranks of the columns. In some cases, the zero-forcing equalization matrix is formed at least in part as a pseudo-inverse matrix of the columns selected from the interference channel matrix. The zero-forcing equalization matrix can be formed by multiplying a channel matrix of desired signals with a combined or hybrid channel matrix that includes the columns selected from the interference channel matrix as described herein.

At 612, the signal vector is equalized, via an equalizer, with the zero-forcing matrix to cancel interference from the signal vector. Equalizing the signal vector may provide a noise-cancelled equalized signal vector or noise-cancelled equalized values of or for the signal vector. In some cases, the noise-cancelled equalized values may include residual noise, which may be further reduced or whitened as described with reference to method 700 below.

Figure 7:
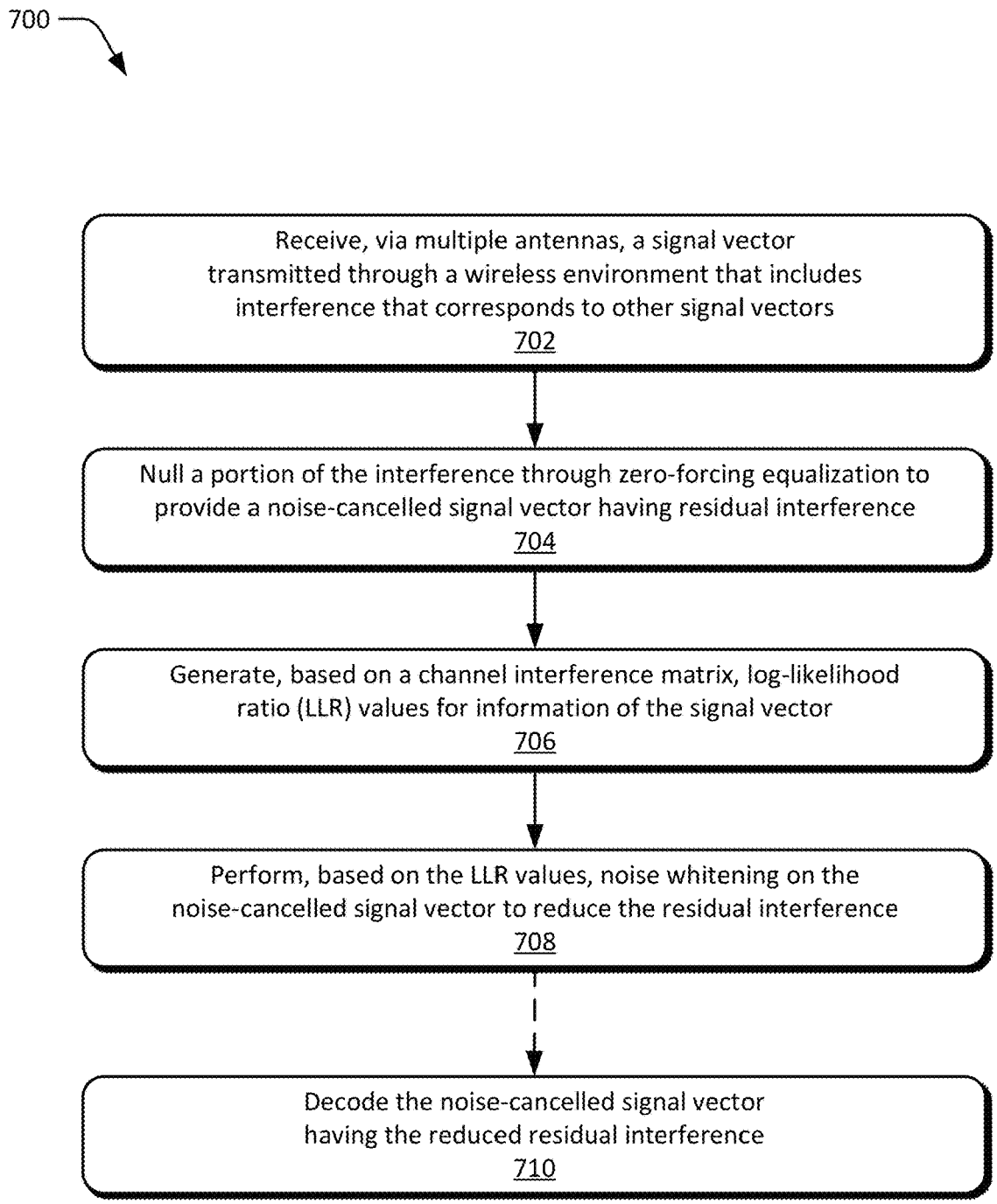
FIG. 7 depicts an example method for whitening residual noise of a noise-cancelled signal vector with log-likelihood ratio (LLR) values.

Optionally at 614, the noise-cancelled equalized values of the signal vector are decoded to obtain information of the signal vector. The noise-cancelled signal vector having reduced residual interference is decoded to obtain information of the signal vector. The noise-cancelled signal vector can be soft-decoded or demodulated depending on a configuration of a receiver performing the decoding operations. The information of the signal vector may correspond to control information or data of a packet or frame transmitted to the receiving device FIG. 7 depicts an example method 700 for whitening residual noise of a noise-cancelled signal vector with log-likelihood ratio (LLR) values, including operations performed by the interference canceller 148.

At 702, a signal vector transmitted through a wireless environment is received via multiple antennas of a receiver. The signal vector includes, or is affected by, interfering signals received with the signal vector. In some cases, the interference is associated with another transmission to another device or another transmission made as part of a MU-MIMO transmission to multiple devices or stations of a wireless network. Alternately or additionally, the interference of the wireless environment is associated with transmissions of an access point or client station of an overlapping basic service set.

At 704, a portion of the interference of the signal vector is nulled through zero-forcing equalization. The zero-forcing equalization of the signal vector may provide a noise-cancelled signal vector having residual interference. In some cases, an interference canceller of the receiver determines a noise-cancelling or zero-forcing equalization matrix by which the portion of interference is nulled from the signal vector.

At 706, log-likelihood ratio (LLR) values are generated for the signal vector based on a channel interference estimate. The LLR values may be generated to whiten flat noise or non-flat noise as described with respect to equations 11 through 13 as described herein. In some cases, a normalizing factor is applied to the LLR values to reduce a range of the LLR values generated.

At 708, noise whitening of the noise-cancelled signal vector is performed based on the LLR values to reduce the residual interference. The noise whitening can be performed on equalized values of the noise-cancelled signal vector provided by an equalizer. Alternately or additionally, the residual noise of the noise-cancelled signal vector can also be scaled, such as during equalization or other post processing operations.

Optionally at 710, the noise-cancelled signal vector having reduced residual interference is decoded to obtain information of the signal vector. The noise-cancelled signal vector can be soft-decoded or demodulated depending on a configuration of a receiver performing the decoding operations. The information of the signal vector may correspond to control information or data of a packet or frame transmitted to the receiving device.

System-On-Chip

Figure 8:
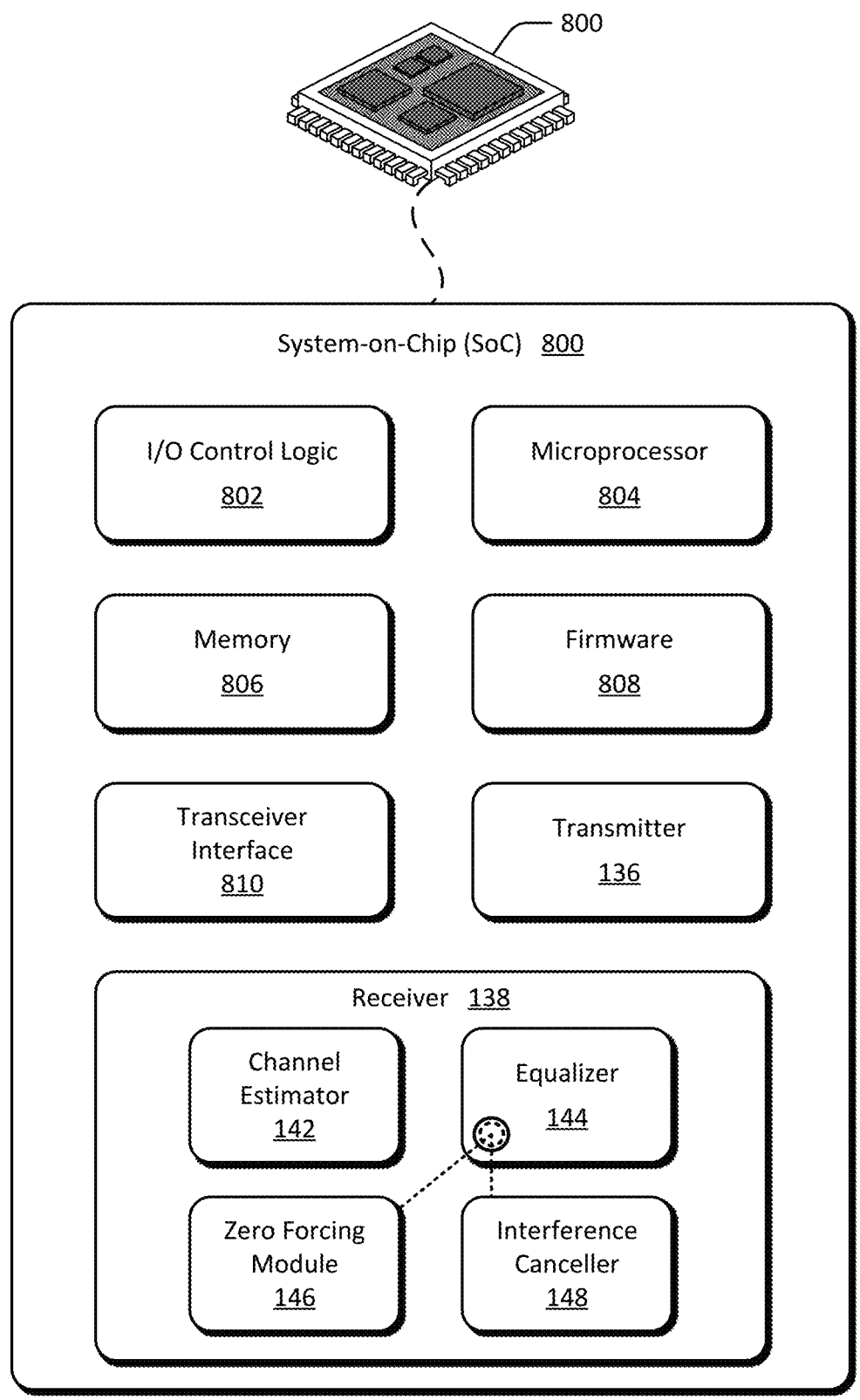
FIG. 8 illustrates an example System-on-Chip (SoC) environment for implementing aspects of dynamic interference cancellation in wireless receivers.

FIG. 8 illustrates an exemplary System-on-Chip (SoC) 800 that can implement various aspects of dynamic interference cancellation for wireless receivers. The SoC 800 can be implemented in any suitable device, such as a host device 102, client device 104, smart-phone, cellular phone, laptop computer, tablet computer, netbook, tablet computer, wireless router, enhanced node access point, network-attached storage, camera, smart appliance, printer, set-top box, or any other suitable type of device (e.g., others listed herein). Although described with reference to a SoC, the entities of FIG. 10 may also be implemented as an application-specific integrated-circuit (ASIC), chip set, communications controller, application-specific standard product (ASSP), digital signal processor (DSP), programmable SoC (PSoC), system-in-package (SiP), or field-programmable gate array (FPGA).

The SoC 800 can be integrated with electronic circuitry, a microprocessor, memory, input-output (I/O) control logic, communication interfaces, other hardware, firmware, and/or software useful to provide functionalities of a wireless communication device, such as any of the devices or components described herein. The SoC 800 may also include an integrated data bus or interconnect fabric (not shown) that couples the various components of the SoC for data communication between the components. Alternately or additionally, the integrated data bus, interconnect fabric, or other components of the SoC 800 may be exposed or accessed through an external port, such as a Joint Test Action Group (JTAG) port, serial peripheral interface (SPI) port, or other suitable data interface. For example, components the SoC 800 may communicate or be configured, programmed (e.g., flashed), and/or accessed through the external port at different stages of manufacture, provisioning, deployment, upgrade, or field service.

In this example, the SoC 800 includes various components such as input-output (I/O) control logic 802 (e.g., to include electronic circuitry) and a processor 804, such as a microprocessor, microcontroller, processor core, application processor, DSP, or the like. The SoC 800 also includes memory 806, which can be any type and/or combination of RAM, SRAM, DRAM, non-volatile memory, ROM, one-time programmable (OTP) memory, multiple-time programmable (MTP) memory, Flash memory, and/or other suitable electronic data storage. In some aspects, the processor 1104 and code stored on the memory 806 are implemented as a baseband processor or communications controller to provide various wireless communication functionalities associated with dynamic interference cancellation in wireless receivers. In the context of this disclosure, the memory 806 stores data, instructions (e.g., of an interference canceller), or other information via non-transitory signals, and does not include carrier waves or other transitory signals.

Alternately or additionally, SoC 800 may comprise a data interface (not shown) for accessing additional or expandable off-chip memory, such as external SRAM or Flash memory. In some cases, the SoC 800 includes various applications, an operating system, software, and/or firmware, which can be embodied as processor-executable instructions maintained on the memory 806 for execution by the microprocessor 804. The SoC 800 can also include other communication interfaces, controllers, or interfaces, such as a transceiver interface 810 for controlling or communicating with components of a local on-chip transceiver, components of an off-chip transceiver, or a combination of on-chip and off-chip transceiver components. Alternately or additionally, the transceiver interface 810 may also include or implement a signal interface to communicate RF, intermediate frequency (IF), or baseband frequency signals off-chip to facilitate wireless communication through multiple antennas coupled to RF ports (not shown) the SoC 800.

The SoC 800 also includes a transmitter 136 and receiver 138, which may be implemented separately as shown or combined as a transceiver component. In accordance with various aspects of dynamic interference cancellation for wireless receivers, the receiver 138 may include a channel estimator 142, an equalizer 144, a zero forcing module 146, and an interference canceller 148. Any of these entities may be embodied as disparate or combined components, as described with reference to various aspects presented herein. Examples of these components and/or entities, or corresponding functionality, are described with reference to the respective components or entities of the environment 100 of FIG. 1, networking environment 200 of FIG. 2, or respective device configurations illustrated in FIG. 3 and/or FIG. 4. The interference canceller 148, either in whole or part, can be implemented as processor-executable instructions maintained by the memory 806 and executed by the microprocessor 804 to implement various aspects and/or features for dynamic interference cancellation in wireless receivers.

The interference canceller 148, can be implemented independently or in combination with any suitable component or circuitry to implement aspects described herein. For example, the channel estimator 142, equalizer 144, zero forcing module 146 and/or interference canceller 148 may be implemented as part of a DSP, communication controller, baseband processor, arithmetic logic unit (ALU), matrix processor, decoding block, demodulation block, or the like. The interference canceller 148 may also be provided integral with other entities of SoC 800, such as integrated with the microprocessor 804, a signal processing block, a vector processing block, or the transceiver interface 810 of the SoC 800. Alternately or additionally, the channel estimator 142, equalizer 144, zero forcing module 146, interference canceller 148 or other components of the SoC 800 can be implemented as hardware, firmware, fixed logic circuitry, or any combination thereof.

Although the subject matter has been described in language specific to structural features and/or methodological operations, it is to be understood that the subject matter defined in the appended claims is not necessarily limited to the specific examples, features, or operations described herein, including orders in which they are performed.

What is claimed is:

1. A device implemented method comprising:
   receiving, via multiple antennas of the device, a signal vector transmitted through a wireless environment, the signal vector being affected by interference of other signals in the wireless environment;
   determining an interference channel matrix for the signal vector based on the interference received with the signal vector;
   computing respective norm values for columns of the interference channel matrix;
   ranking the columns of the interference channel matrix based on the respective norm values of the columns;
   selecting, from the interference channel matrix and based on the rankings of the columns, one or more of the columns of the interference channel matrix to form a noise-cancelling equalization matrix, the noise-cancelling equalization matrix formed at least in part as a pseudo-inverse matrix of the columns selected from the interference channel matrix; and
   equalizing the signal vector with the noise-cancelling equalization matrix to remove at least a portion of the interference from the signal vector to provide noise-cancelled equalized values of the signal vector.

2. The method as recited in claim 1, further comprising decoding the noise-cancelled equalized values of the signal vector to obtain information from the signal vector.

3. The method as recited in claim 1, wherein equalizing the signal vector comprises equalizing, via a zero-forcing equalizer, the signal vector with the noise-cancelling equalization matrix.

4. The method as recited in claim 1, wherein:
   the columns of the interference matrix are selected based on a respective signal and noise power function of one or more of the columns;
   the columns of the interference matrix are sorted based on the respective signal and noise power function of one or more of the columns; or
   the selected columns of the interference matrix are determined as linearly independent columns of the interference matrix.

5. The method as recited in claim 1, further comprising:
   generating log-likelihood ratio (LLR) values based at least in part on the channel interference matrix; and
   whitening, based on the LLR values, residual noise of the noise-cancelled equalized values of the signal vector that is not removed during equalization of the signal vector.

6. The method as recited in claim 5, wherein the LLR values are generated using an estimation of channel interference determined from the channel interference matrix or the noise-cancelling equalization matrix.

7. The method as recited in claim 1, wherein:
   the signal vector that is received is precoded via zero-forcing precoding by a transmitter prior to transmission through the wireless environment; or
   the signal vector is received as part of a spatial stream of a multiple-user multiple-input multiple-output (MU-MIMO) transmission.

8. The method as recited in claim 1, wherein the signal vector is communicated in accordance with one of the Institute of Electronics and Electrical Engineers (IEEE) 802.11ac specification, the IEEE 802.11ad specification, the IEEE 802.11ax specification, or the IEEE 802.1 lay specification.

9. The method as recited in claim 1, wherein the noise-cancelling equalization matrix is further formed at least in part via a singular value decomposition (SVD) of the interference channel matrix.

10. The method as recited in claim 1, wherein the noise-cancelling equalization matrix is further formed at least in part via a sorted QR decomposition of the interference channel matrix.

11. An apparatus for wireless communication comprising:
    multiple antennas;
    a receiver having multiple inputs coupled to respective ones of the multiple antennas and being configured to receive data in a wireless environment;
    an equalizer operably associated with the receiver of the apparatus; and
    an interference canceller configured to:
       receive, via the multiple antennas, a signal vector transmitted through a wireless environment, the signal vector being affected by interference of other signals transmitted with the signal vector;
       determine an interference channel matrix for the signal vector based on the interference received with the signal vector;
       compute respective norm values for columns of the interference channel matrix;
       rank the columns of the interference channel matrix based on the respective norm values of the columns;
       select, from the interference channel matrix and based on the rankings of the columns, one or more of the columns of the interference channel matrix to form a noise-cancelling equalization matrix, the noise-cancelling equalization matrix formed at least in part as a pseudo-inverse matrix of the columns selected from the interference channel matrix; and
       equalize, with the equalizer and based on noise-cancelling equalization matrix, the signal vector to remove at least a portion of the interference from the signal vector to provide noise-cancelled equalized values of the signal vector.

12. The apparatus as recited in claim 11, further comprising a decoder configured to decode the noise-cancelled equalized values of the signal vector to obtain information from the signal vector.

13. The apparatus as recited in claim 11, wherein the equalizer is a zero-forcing equalizer and the interference canceller is configured to the signal vector with the zero-forcing equalizer to provide the noise-cancelled equalized values of the signal vector.

14. The apparatus as recited in claim 11 wherein:
    the columns of the interference matrix are selected or sorted based on a respective signal and noise power function of one or more of the columns;
    the columns of the interference matrix are sorted based on a respective signal and noise power function of one or more of the columns;
    the selected columns of the interference matrix are determined as linearly independent columns of the interference matrix;
    the noise-cancelling equalization matrix is determined at least in part via a singular value decomposition (SVD) of the interference channel matrix; or
    the noise-cancelling equalization matrix is determined at least in part via a QR decomposition of the interference channel matrix.

15. The apparatus as recited in claim 11, wherein the interference canceller is further configured to:

generate log-likelihood ratio (LLR) values based at least in part on the channel interference matrix; and whiten, based on the LLR values, residual noise of the noise-cancelled equalized values of the signal vector that is not removed during equalization of the signal vector.

16. A System-on-Chip (SoC) comprising:

a receiver that includes multiple receive chains;

a zero-forcing equalizer;

a hardware-based processor;

a memory storing processor-executable instructions that, responsive to execution by the hardware-based processor, implement an interference canceller to:

receive, via the multiple receive chains of the receiver, a signal vector transmitted through a wireless environment, the signal vector being affected by interference of other signals in the wireless environment;

determine an interference channel matrix for the signal vector based on the interference received with the signal vector;

compute respective norm values for columns of the interference channel matrix;

rank the columns of the interference channel matrix based on the respective norm values of the columns;

select, from the interference channel matrix and based on the rankings of the columns, one or more of the columns of the interference channel matrix to form a noise-cancelling equalization matrix, the noise-cancelling equalization matrix formed at least in part as a pseudo-inverse matrix of the columns selected from the interference channel matrix; and cause the zero-forcing equalizer to equalize, based on noise-cancelling equalization matrix, the signal vector to remove at least some of the interference from the signal vector to provide noise-cancelled equalized values of the signal vector.

17. The SoC as recited in claim 15, further comprising a decoder configured to decode the noise-cancelled equalized values of the signal vector to obtain information from signal vector.

18. The SoC as recited in claim 16, wherein the interference canceller is further implemented to:

estimate, based on the interference of the wireless environment, an estimated interference channel for the wireless environment through which the signal vector is received; and determine the interference channel matrix for the signal vector based on the estimated interference channel.

19. The SoC as recited in claim 16, wherein the interference canceller is further implemented to:

generate log-likelihood ratio (LLR) values based at least in part on the channel interference matrix; and whiten, based on the LLR values, residual noise of the noise-cancelled equalized values of the signal vector that is not removed during equalization of the signal vector.

20. The SoC as recited in claim 16, wherein the interference canceller is further implemented to select the one or more of the columns of the interference channel matrix to form the noise-cancelling equalization matrix based on a respective signal and noise power function of the one or more of the columns.

* * * * *